(12) United States Patent
Kwon et al.

(10) Patent No.: US 11,279,881 B2
(45) Date of Patent: Mar. 22, 2022

(54) LIQUID CRYSTAL ALIGNING AGENT COMPOSITION, METHOD FOR PREPARING LIQUID CRYSTAL ALIGNMENT FILM USING SAME, AND LIQUID CRYSTAL ALIGNMENT FILM USING SAME

(71) Applicant: LG CHEM, LTD., Seoul (KR)

(72) Inventors: Soon Ho Kwon, Daejeon (KR); Jung Ho Jo, Daejeon (KR); Hang Ah Park, Daejeon (KR); Jun Young Yoon, Daejeon (KR); Hyeong Seuk Yun, Daejeon (KR)

(73) Assignee: LG CHEM, LTD., Seoul (KR)

( * ) Notice: Subject to any disclaimer, the term of this patent is extended or adjusted under 35 U.S.C. 154(b) by 125 days.

(21) Appl. No.: 16/610,423

(22) PCT Filed: Oct. 22, 2018

(86) PCT No.: PCT/KR2018/012497
§ 371 (c)(1),
(2) Date: Nov. 1, 2019

(87) PCT Pub. No.: WO2019/088533
PCT Pub. Date: May 9, 2019

(65) Prior Publication Data
US 2020/0148953 A1    May 14, 2020

(30) Foreign Application Priority Data
Nov. 3, 2017 (KR) .................. 10-2017-0146283

(51) Int. Cl.
*C09K 19/54* (2006.01)
*C08G 73/10* (2006.01)
*C08L 79/08* (2006.01)
*G02F 1/1337* (2006.01)

(52) U.S. Cl.
CPC .......... *C09K 19/542* (2013.01); *C08G 73/105* (2013.01); *C08L 79/08* (2013.01); *G02F 1/13378* (2013.01); *G02F 1/133723* (2013.01); *C09K 2019/548* (2013.01); *C09K 2323/00* (2020.08); *C09K 2323/02* (2020.08); *C09K 2323/027* (2020.08)

(58) Field of Classification Search
CPC ............... C09K 19/56; C09K 2323/00; C09K 2323/02; C09K 2323/027; C08G 59/506; C08G 73/10; G02F 1/1337; G02F 1/133711; G02F 1/133723

USPC ....... 428/1.1, 1.2, 1.26; 252/299.4; 528/353; 525/449

See application file for complete search history.

(56) References Cited

U.S. PATENT DOCUMENTS

| | | | |
|---|---|---|---|
| 3,804,804 | A | 4/1974 | Gerber et al. |
| 9,034,567 | B2 | 5/2015 | Miyake et al. |
| 10,606,128 | B2 | 3/2020 | Kwon et al. |
| 2008/0231786 | A1 | 9/2008 | Shin |
| 2009/0299014 | A1 | 12/2009 | Oh et al. |
| 2010/0243955 | A1* | 9/2010 | Tsai .................. C08L 79/08 252/299.4 |
| 2015/0045481 | A1 | 2/2015 | Kim et al. |
| 2015/0232665 | A1 | 8/2015 | Hsu |
| 2015/0299570 | A1 | 10/2015 | Kurisawa et al. |

FOREIGN PATENT DOCUMENTS

| | | |
|---|---|---|
| JP | H09-124791 A | 5/1997 |
| JP | H09-297312 A | 11/1997 |
| JP | 2012-150251 A | 8/2012 |
| JP | 2015-040950 A | 3/2015 |
| JP | 2015-176110 A | 10/2015 |
| JP | 2015-222387 A | 12/2015 |
| KR | 10-0851787 B1 | 8/2008 |
| KR | 10-2008-0086058 A | 9/2008 |
| KR | 10-2013-0103023 A | 9/2013 |
| KR | 10-2015-0013446 A | 2/2015 |
| KR | 10-2015-0108742 A | 9/2015 |
| KR | 10-2016-0095801 A | 8/2016 |
| KR | 10-2017-0040087 A | 4/2017 |
| TW | 201537271 A | 10/2015 |

OTHER PUBLICATIONS

Search Report and Written Opinion issued for PCT Application No. PCT/KR2018/012497 dated Apr. 12, 2018, 11 pages.
In, Insik, and Sang Youl Kim. "Soluble wholly aromatic polyamides containing unsymmetrical pyridyl ether linkages." Polymer 47 (2006): 547-552.

* cited by examiner

*Primary Examiner* — Ruiyun Zhang
(74) *Attorney, Agent, or Firm* — Rothwell, Figg, Ernst & Manbeck, P.C.

(57) ABSTRACT

A liquid crystal aligning agent composition for preparing a liquid crystal alignment film having enhanced stability and exhibiting excellent electrical characteristics, a method for preparing a liquid crystal alignment film using the same, and a liquid crystal alignment film and a liquid crystal display device using the liquid crystal alignment film.

17 Claims, No Drawings

LIQUID CRYSTAL ALIGNING AGENT COMPOSITION, METHOD FOR PREPARING LIQUID CRYSTAL ALIGNMENT FILM USING SAME, AND LIQUID CRYSTAL ALIGNMENT FILM USING SAME

CROSS-REFERENCE TO RELATED APPLICATION(S)

This application is a 35 U.S.C. 371 National Phase Entry Application from PCT/KR2018/012497, filed on Oct. 22, 2018, which claims the benefits of the filing date of Korean Patent Application No. 10-2017-0146283 filed with the Korean Intellectual Property Office on Nov. 3, 2017, the entire contents of which are incorporated herein by reference.

TECHNICAL FIELD

The present invention relates to a liquid crystal aligning agent composition for preparing a liquid crystal alignment film having enhanced stability and exhibiting excellent electrical characteristics, a method for preparing a liquid crystal alignment film using the same, and a liquid crystal alignment film and a liquid crystal display device using the same.

BACKGROUND ART

In order to obtain uniform brightness and a high contrast ratio in a liquid crystal display device, it is essential to uniformly align liquid crystals. A liquid crystal aligning agent acts as a director in the arrangement of liquid crystal molecules, and makes it possible to take an appropriate direction when the liquid crystals are moved due to an electric field to form an image.

As a conventional liquid crystal aligning agent, polyimide, polyamide, polyester, and the like are widely known. Among them, in particular, polyimide has excellent heat resistance, affinity of liquid crystals, mechanical strength, and the like, and thus it has been used in many liquid crystal display devices.

However, recently, as the demand for low-power displays has increased, it has been discovered that liquid crystal aligning agents can affect not only the fundamental properties of the alignment of liquid crystal but also electrical characteristics such as with respect to an after-image or a voltage holding ratio caused by a DC/AC voltage. Accordingly, there is an increasing need to develop liquid crystal alignment materials capable of realizing excellent liquid crystal alignment properties and electrical characteristics at the same time.

For this purpose, various attempts have been made to improve physical/chemical properties of the liquid crystal aligning agent by changing the structure itself of the liquid crystal aligning agent, for example, through a method of modifying a monomer used in the preparation of the liquid crystal aligning agent or a method of combining a plurality of different monomers, or the like, but it has not yet achieved remarkably improved physical properties.

In this regard, there is a need to develop a new liquid crystal aligning agent having excellent liquid crystal alignment property, durability, and electrical characteristics.

DETAILED DESCRIPTION OF THE INVENTION

Technical Solution

The present invention provides a liquid crystal aligning agent composition for preparing a liquid crystal alignment film having not only excellent alignment property and stability, but also excellent electrical characteristics.

The present invention also provides a method for preparing a liquid crystal alignment film using the above-described liquid crystal aligning agent composition.

The present invention further provides a liquid crystal alignment film prepared by the above-described preparation method, and a liquid crystal display device including the same.

The present invention provides a liquid crystal aligning agent composition including: a first polymer for a liquid crystal aligning agent including one or more repeating units selected from the group consisting of a repeating unit represented by the following Chemical Formula 1, a repeating unit represented by the following Chemical Formula 2, and a repeating unit represented by the following Chemical Formula 3; a second polymer for a liquid crystal aligning agent including one or more repeating units selected from the group consisting of a repeating unit represented by the following Chemical Formula 4, a repeating unit represented by the following Chemical Formula 5, and a repeating unit represented by the following Chemical Formula 6; and a third polymer for a liquid crystal aligning agent including one or more repeating units selected from the group consisting of a repeating unit represented by the following Chemical Formula 7, a repeating unit represented by the following Chemical Formula 8, and a repeating unit represented by the following Chemical Formula 9.

[Chemical Formula 1]

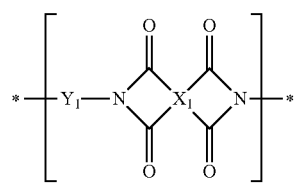

[Chemical Formula 2]

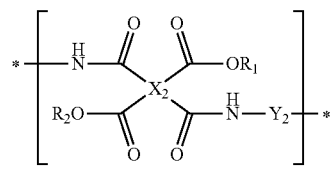

[Chemical Formula 3]

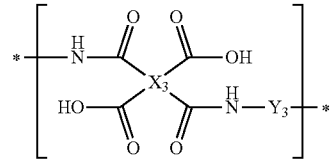

[Chemical Formula 4]

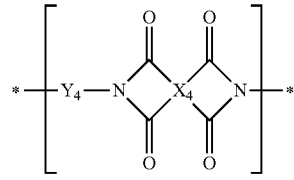

[Chemical Formula 5]

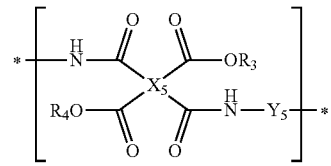

[Chemical Formula 6]

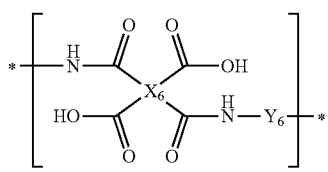

[Chemical Formula 7]

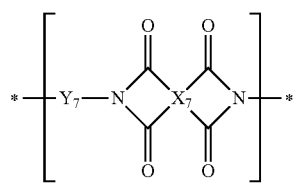

[Chemical Formula 8]

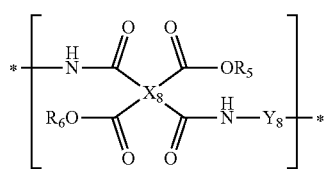

[Chemical Formula 9]

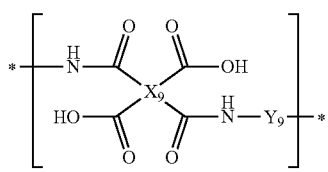

In Chemical Formulae 1 to 9, at least one of $R_1$ and $R_2$ is an alkyl group having 1 to 10 carbon atoms and the other is hydrogen, at least one of $R_3$ and $R_4$ is an alkyl group having 1 to 10 carbon atoms and the other is hydrogen, and at least one of $R_5$ and $R_6$ is an alkyl group having 1 to 10 carbon atoms and the other is hydrogen, $X_1$ to $X_9$ are each independently a tetravalent organic group represented by the following Chemical Formula 10,

[Chemical Formula 10]

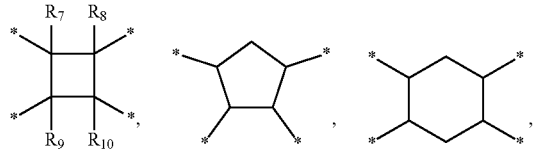

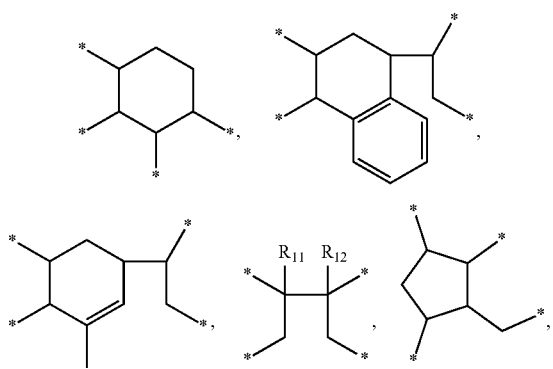

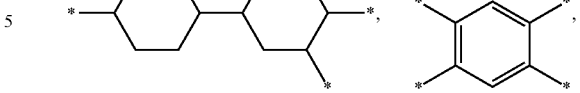

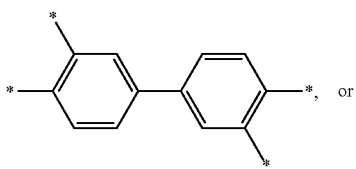

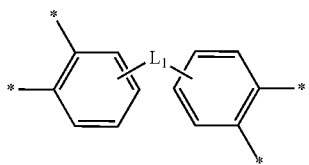

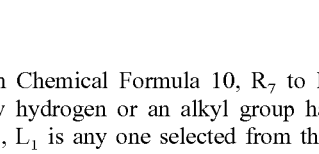

wherein, in Chemical Formula 10, $R_7$ to $R_{12}$ are each independently hydrogen or an alkyl group having 1 to 6 carbon atoms, $L_1$ is any one selected from the group consisting of a single bond, —O—, —CO—, —COO—, —S—, —SO—, —SO$_2$—, —CR$_{13}$R$_{14}$—, —(CH$_2$)$_z$—, —O(CH$_2$)$_z$O—, COO(CH$_2$)$_z$OCO—, —CONH—, phenylene, and a combination thereof, wherein $R_{13}$ and $R_{14}$ are each independently hydrogen, or an alkyl group or a fluoroalkyl group having 1 to 10 carbon atoms, z is an integer of 1 to 10, $Y_7$ to $Y_9$ are each independently a divalent organic group represented by the following Chemical Formula 11.

[Chemical Formula 11]

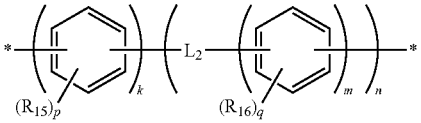

wherein, in Chemical Formula 11, $R_{15}$ and $R_{16}$ are each independently hydrogen, a halogen, a cyano, a nitrile, an alkyl having 1 to 10 carbon atoms, an alkenyl having 1 to 10 carbon atoms, an alkoxy having 1 to 10 carbon atoms, a fluoroalkyl having 1 to 10 carbon atoms, or a fluoroalkoxy having 1 to 10 carbon atoms, p and q are each independently an integer of 0 to 4, $L_2$ is a single bond, —O—, —CO—, —S—, —SO$_2$—, —C(CH$_3$)$_2$—, —C(CF$_3$)$_2$—, —CONH—, —COO—, —(CH$_2$)$_y$—, —O(CH$_2$)$_y$O—, —O(CH$_2$)$_y$—, —NH—, —NH(CH$_2$)$_y$—NH—, —NH(CH$_2$)$_y$O—, —OCH$_2$—C(CH$_3$)$_2$—CH$_2$O—, —COO—(CH$_2$)$_y$—OCO—, or —OCO—(CH$_2$)$_y$—COO—, y is an integer of 1 to 10, k and m are each independently an integer of 0 to 3, n is an integer of 0 to 3, $Y_1$ to $Y_3$ are each independently a divalent organic group represented by the following Chemical Formula 12,

[Chemical Formula 12]

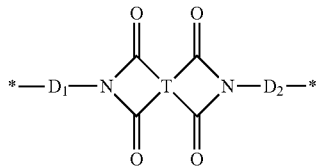

wherein, in Chemical Formula 12, T is a tetravalent organic group represented by Chemical Formula 10, $D_1$ and $D_2$ are each independently an alkylene group having 1 to 20 carbon atoms, a heteroalkylene group having 1 to 10 carbon atoms, a cycloalkylene group having 3 to 20 carbon atoms, an arylene group having 6 to 20 carbon atoms, or a heteroarylene group having 2 to 20 carbon atoms, $Y_4$ to $Y_6$ are each independently a divalent organic group represented by the following Chemical Formula 13,

[Chemical Formula 13]

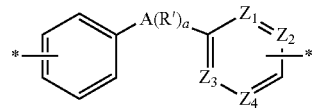

wherein, in Chemical Formula 13, A is a Group 16 element, R' is hydrogen or an alkyl having 1 to 10 carbon atoms, a is an integer of 0 to 3, and at least one of $Z_1$ to $Z_4$ is nitrogen, and the rest are carbon.

Throughout the specification, when one part "includes" one constituent element, unless otherwise specifically described, this does not mean that another constituent element is excluded, but means that another constituent element may be further included.

As used herein, the term "substituted" means that other functional groups instead of a hydrogen atom in the compound are bonded, and a position to be substituted is not limited as long as the position is one at which the hydrogen atom is substituted, that is, a position at which the substituent can be substituted, and when two or more are substituted, the two or more substituents may be the same as or different from each other.

As used herein, the term "substituted or unsubstituted" means being unsubstituted or substituted with one or more substituents selected from the group consisting of deuterium; a halogen group; a cyano group; a nitro group; a hydroxyl group; a carbonyl group; an ester group; an imide group; an amide group; an amino group; a carboxy group; a sulfonic acid group; a sulfonamide group; a phosphine oxide group; an alkoxy group; an aryloxy group; an alkylthioxy group; an arylthioxy group; an alkylsulfoxy group; an arylsulfoxy group; a silyl group; a boron group; an alkyl group; a cycloalkyl group; an alkenyl group; an aryl group; an aralkyl group; an aralkenyl group; an alkylaryl group; an arylphosphine group; or a heterocyclic group containing at least one of N, O, and S atoms, or being unsubstituted or substituted with a substituent to which two or more substituents are linked among the substituents exemplified above. For example, "the substituent to which two or more substituents are linked" may be a biphenyl group. That is, the biphenyl group may also be an aryl group, and may be interrupted as a substituent to which two phenyl groups are linked.

As used herein, the notation ⁓ or ⋯⋯* means a bond linked to another substituent group, and a direct bond means the case in which no separate atom is present at a part represented by L.

As used herein, the alkyl group may be straight-chained or branched, and the number of carbon atoms thereof is not particularly limited, but is preferably 1 to 10. According to another exemplary embodiment, the number of carbon atoms of the alkyl group is 1 to 6. Specific examples of the alkyl group include methyl, ethyl, propyl, n-propyl, isopropyl, butyl, n-butyl, isobutyl, tert-butyl, sec-butyl, 1-methylbutyl, 1-ethyl-butyl, pentyl, n-pentyl, isopentyl, neopentyl, tert-pentyl, hexyl, n-hexyl, 1-methylpentyl, 2-methylpentyl, 4-methyl-2-pentyl, 3,3-dimethylbutyl, 2-ethylbutyl, heptyl, n-heptyl, 1-methylhexyl, cyclopentylmethyl, cycloheptylmethyl, octyl, n-octyl, tert-octyl, 1-methylheptyl, 2-ethylhexyl, 2-propylpentyl, n-nonyl, 2,2-dimethylheptyl, 1-ethylpropyl, 1,1-dimethyl-propyl, isohexyl, 2-methylpentyl, 4-methylhexyl, 5-methylhexyl, and the like, but are not limited thereto.

The fluoroalkyl group having 1 to 10 carbon atoms may be a group in which at least one hydrogen in the alkyl group having 1 to 10 carbon atoms is substituted with fluorine, and the fluoroalkoxy group having 1 to 10 carbon atoms may be a group in which at least one hydrogen in the alkoxy group having 1 to 10 carbon atoms is substituted with fluorine.

As used herein, the aryl group is a monovalent functional group derived from arene, and for example, may be monocyclic or polycyclic. Specifically, the monocyclic aryl group may include, but is not limited to, a phenyl group, a biphenyl group, a terphenyl group, a stilbenyl group, or the like. The polycyclic aryl group may include, but is not limited to, a naphthyl group, an anthryl group, a phenanthryl group, a pyrenyl group, a perylenyl group, a chrycenyl group, a fluorenyl group, or the like. At least one hydrogen atom in the aryl group may be substituted with a substituent as in the case of the alkyl group.

The halogen may be fluorine (F), chlorine (Cl), bromine (Br), or iodine (I).

The nitrogen oxide is a compound in which a nitrogen atom and an oxygen atom are bonded, and the nitrogen oxide functional group means a functional group containing a nitrogen oxide in the functional group. As an example of the nitrogen oxide functional group, a nitro group ($-NO_2$) or the like can be used.

As used herein, the alkylene group is a bivalent functional group derived from alkane, and the number of carbon atoms thereof is 1 to 20, 1 to 10, or 1 to 5. For example, it may be a straight-chain, branched-chain, or cyclic group, such as methylene group, ethylene group, propylene group, isobutylene group, sec-butylene group, tert-butylene group, pentylene group, hexylene group, or the like. At least one hydrogen atom contained in the alkylene group may be substituted with a substituent as in the case of the alkyl group.

As used herein, the heteroalkylene group is an alkylene group containing oxygen (O), nitrogen (N), or sulfur (S) as a heteroatom, and the number of carbon atoms thereof is 1 to 10, or 1 to 5. Examples thereof may be oxyalkylene and the like. At least one hydrogen atom contained in the heteroalkylene group may be substituted with a substituent as in the case of the alkyl group.

As used herein, the cycloalkylene group is a divalent functional group derived from cycloalkane, and the number of carbon atoms thereof is 3 to 20, or 3 to 10. Examples thereof include cyclopropylene, cyclobutylene, cyclopentylene, 3-methylcyclopentylene, 2,3-dimethylcyclopentylene, cyclohexylene, 3-methylcyclohexylene, 4-methylcyclohexylene, 2,3-dimethylcyclohexylene, 3,4,5-trimethylcyclohexylene, 4-tert-butylcyclohexylene, cycloheptylene, cyclooctylene, and the like, but are not limited thereto.

As used herein, the arylene group may be a bivalent functional group derived from arene, it may be monocyclic or polycyclic, and the number of carbons thereof is 6 to 20, or 6 to 10. Examples thereof may include, but are not limited to, a phenylene group, a biphenylene group, a terphenylene group, a stilbenylene group, a naphthylenyl group, or the like. At least one hydrogen atom contained in the arylene group may be substituted with a substituent as in the case of the alkyl group.

As used herein, the heteroarylene group has 2 to 20 carbon atoms, 2 to 10 carbon atoms, or 6 to 20 carbon atoms. It is an arylene group containing O, N, or S as a heteroatom, and at least one hydrogen atom contained in the heteroarylene group may be substituted with a substituent as in the case of the alkyl group, respectively.

As used herein, the weight average molecular weight means a weight average molecular weight in terms of polystyrene measured by a GPC method. In the process of determining the weight average molecular weight in terms of polystyrene measured by the GPC method, a commonly known analyzing device, a detector such as a refractive index detector, and an analytical column can be used. Commonly applied conditions for temperature, solvent, and flow rate can be used. Specific examples of the measurement conditions are as follows: a Waters PL-GPC220 instrument is used, Polymer Laboratories PLgel MIX-B 300 mm column is used at an evaluation temperature of 160° C., 1,2,4-trichlorobenzene is used as a solvent, the flow rate is 1 mL/min, a sample is prepared at a concentration of 10 mg/10 mL and then fed in an amount of 200 μL, and the value of Mw can be determined using calibration curves formed from a polystyrene standard. The molecular weight of the polystyrene standards used herein is nine kinds of 2000/10,000/30,000/70,000/200,000/700,000/2,000,000/4,000,000/10,000,000.

The liquid crystal aligning agent composition according to the present invention is characterized by further including a third polymer for a liquid crystal aligning agent which is a general polyimide precursor, together with a first polymer for a liquid crystal aligning agent which is a partially imidized polyimide precursor, and a second polymer for a liquid crystal aligning agent which is a polyimide precursor derived from a diamine having an asymmetric pyridine structure.

When an existing polyimide is used as a liquid crystal alignment film, a polyimide precursor having excellent solubility, such as a polyamic acid or a polyamic acid ester, is coated and dried to form a coating film, which is then converted into polyimide through a high-temperature heat treatment process, and then subjected to light irradiation to perform alignment treatment. However, in order to obtain sufficient liquid crystal alignment properties by subjecting the film in the form of a polyimide to light irradiation, not only is a large amount of light irradiation energy required, but also an additional heat treatment process is undertaken for securing alignment stability after the light irradiation. Since the large amount of light irradiation energy and the additional high-temperature heat treatment process are very disadvantageous in view of the process cost and process time, a limitation in applying it to actual mass preparation process has existed.

In an effort to solve this problem, a liquid crystal aligning agent composition in which the first polymer for a liquid crystal aligning agent and the third polymer for a liquid crystal aligning agent are mixed has been developed, and thereby not only can the light irradiation energy be greatly reduced by the first polymer, but also a liquid crystal alignment film having excellent alignment properties and stability as well as an excellent voltage holding ratio and electrical characteristics has been prepared even by a simple process step including one heat treatment step.

However, the present inventors have that when a second polymer for a liquid crystal aligning agent including the repeating units of Chemical Formulae 4 to 6, which is prepared from a reactant containing a diamine compound of a specific structure containing an oxygen atom or the like, is included in the composition in which the first polymer for a liquid crystal aligning agent and the third polymer for a liquid crystal aligning agent are mixed, the liquid crystal alignment film prepared therefrom has a high voltage holding ratio even at a high temperature, and thus electrical characteristics and stability can be greatly improved, the reduction of contrast ratio or the afterimage phenomenon can be improved, and the alignment stability to heat stress and the mechanical strength of the alignment film are also improved. The present invention has been completed on the basis of such findings.

According to one embodiment of the present invention, a liquid crystal aligning agent composition can be provided, including: a first polymer for a liquid crystal aligning agent including one or more repeating units selected from the group consisting of a repeating unit represented by Chemical Formula 1, a repeating unit represented by Chemical Formula 2, and a repeating unit represented by Chemical Formula 3; a second polymer for a liquid crystal aligning agent including one or more repeating units selected from the group consisting of a repeating unit represented by Chemical Formula 4, a repeating unit represented by Chemical Formula 5, and a repeating unit represented by Chemical Formula 6; and a third polymer for a liquid crystal aligning agent including one or more repeating units selected from the group consisting of a repeating unit represented by Chemical Formula 7, a repeating unit represented by Chemical Formula 8, and a repeating unit represented by Chemical Formula 9.

Specifically, the first polymer for liquid crystal aligning agent may include any one of a repeating unit represented by Chemical Formula 1, a repeating unit represented by Chemical Formula 2, and a repeating unit represented by Chemical Formula 3, or a mixture of two types thereof, or a mixture of all three types thereof.

In addition, the second polymer for a liquid crystal aligning agent may include any one of a repeating unit represented by Chemical Formula 4, a repeating unit represented by Chemical Formula 5, and a repeating unit represented by Chemical Formula 6, or a mixture of two types thereof, or a mixture of all three types thereof.

Further, the third polymer for a liquid crystal aligning agent may include any one of a repeating unit represented by Chemical Formula 7, a repeating unit represented by Chemical Formula 8, and a repeating unit represented by Chemical Formula 9, or a mixture of two types thereof, or a mixture of all three types thereof.

Specifically, in the first polymer for a liquid crystal aligning agent, the second polymer for a liquid crystal aligning agent, and the third polymer for a liquid crystal aligning agent contained in the liquid crystal aligning agent composition according to one embodiment of the present invention. $X_1$ to $X_9$ may each independently be a tetravalent organic group represented by the following Chemical Formula 10.

[Chemical Formula 10]

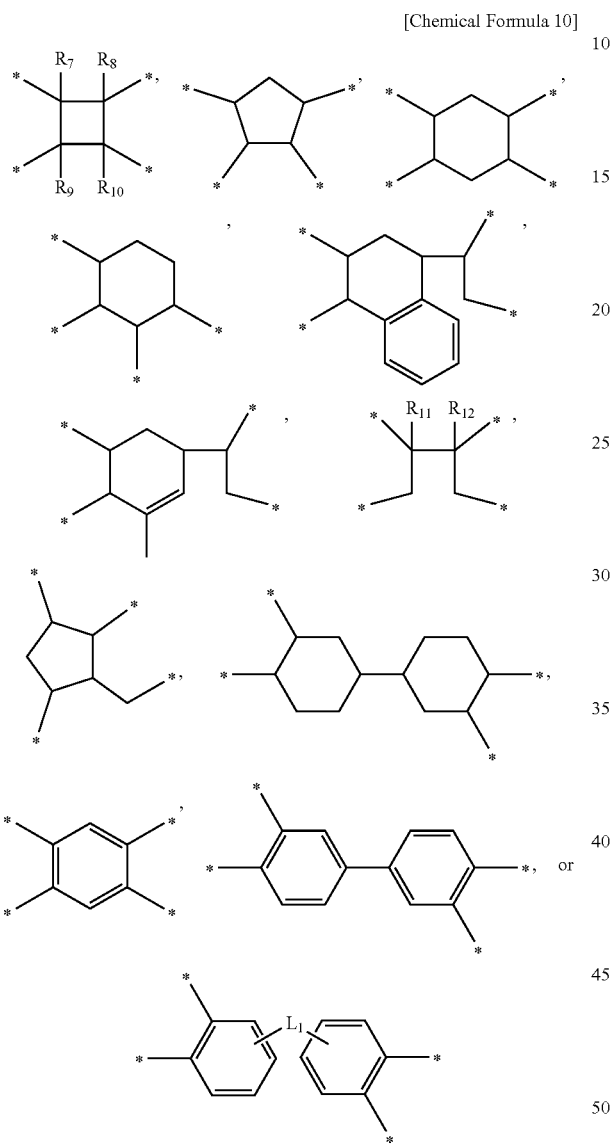

In Chemical Formula 10, $R_7$ to $R_{12}$ are each independently hydrogen or an alkyl group having 1 to 6 carbon atoms, $L_1$ is any one selected from the group consisting of a single bond, —O—, —CO—, —COO—, —S—, —SO—, —SO$_2$—, —CR$_{13}$R$_{14}$—, —(CH$_2$)$_z$—, —O(CH$_2$)$_z$O—, —COO(CH$_2$)$_z$OCO—, —CONH—, phenylene, and a combination thereof, wherein $R_{13}$ and $R_{14}$ are each independently hydrogen, or an alkyl group or a fluoroalkyl group having 1 to 10 carbon atoms, and z is an integer of 1 to 10.

More preferably, the $X_1$ to $X_9$ may each independently be an organic group of the following Chemical Formula 10-1 derived from cyclobutane-1,2,3,4-tetracarboxylic dianhydride, an organic group of the following Chemical Formula 10-2 derived from 1,3-dimethylcyclobutane-1,2,3,4-tetracarboxylic dianhydride, an organic group of the following Chemical Formula 10-3 derived from tetrahydro-[3,3'-bifuran]-2,2',5,5'-tetraone, an organic group of the following Chemical Formula 10-4 derived from 1,2,4,5-cyclohexanetetracarboxylic dianhydride, an organic group of the following Chemical Formula 10-5 derived from pyromellitic dianhydride, or an organic group of the following Chemical Formula 10-6 derived from 3,3',4,4'-biphenyltetracarboxylic dianhydride.

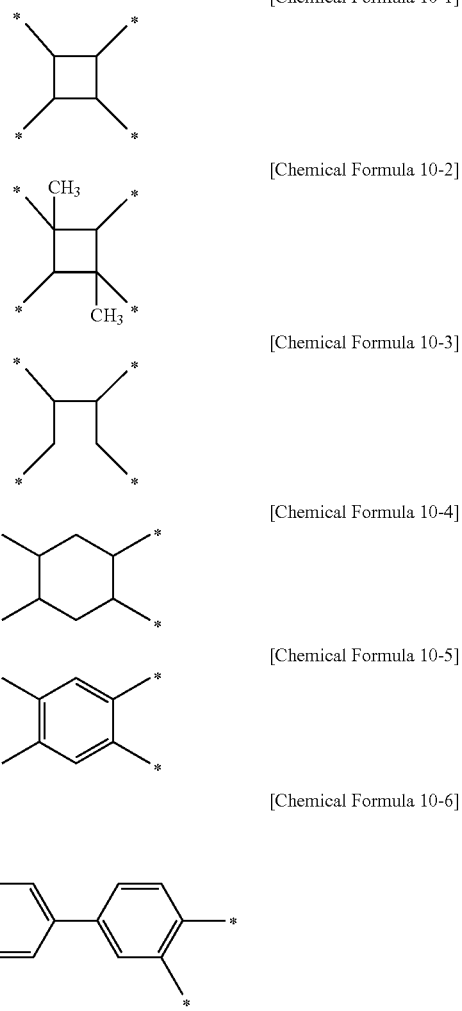

Meanwhile, in the liquid crystal aligning agent composition according to the one embodiment, the third polymer for a liquid crystal aligning agent may include Chemical Formulae 7 to 9, where $Y_7$ to $Y_9$ are each independently a divalent organic group represented by Chemical Formula 11. By including the third polymer for a liquid crystal aligning agent containing the organic group of Chemical Formula 11, the electrical characteristics of the alignment film such as the voltage holding ratio can be greatly improved, the alignment property of the liquid crystal alignment film is amplified, and the mechanical properties can be improved such that the durability of the alignment film can be secured.

In Chemical Formula 11, hydrogen is bonded to carbon not substituted with $R_{15}$ or $R_{16}$, and when p or q is an integer of 2 to 4, a plurality of $R_{15}$ or $R_{16}$ may be the same or different substituents. Further, in Chemical Formula 11, k and m are each independently an integer of 0 to 3 or an integer of 1 to 3, and n may be an integer of 0 to 3 or an integer of 0 or 1.

More specifically, examples of Chemical Formula 11 are not particularly limited, but for example, it may be a functional group represented by the following Chemical Formula 14 or 15.

[Chemical Formula 14]

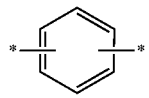

[Chemical Formula 15]

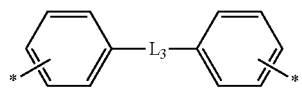

In Chemical Formula 15, $L_3$ is a single bond, —O—, —SO$_2$—, —O(CH$_2$)$_y$O—, or —CR$_{17}$R$_{18}$—, wherein y is an integer of 1 to 10, and R$_{17}$ and R$_{18}$ are hydrogen or an alkyl having 1 to 10 carbon atoms.

Preferably, Chemical Formula 14 may be the following Chemical Formula 14-1.

[Chemical Formula 14-1]

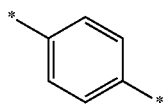

Further, Chemical Formula 15 may be the following Chemical Formula 15-1.

[Chemical Formula 15-1]

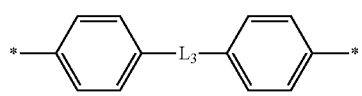

In Chemical Formula 15-1, $L_3$ is —O—, —O(CH$_2$)$_2$O—, or —CH$_2$—.

Meanwhile, in the liquid crystal aligning agent composition according to the one embodiment, the first polymer for a liquid crystal aligning agent may include the repeating units of Chemical Formulae 1 to 3 where $Y_1$ to $Y_3$ are each independently a divalent organic group represented by Chemical Formula 12. As the first polymer is synthesized from a diamine containing imide repeating units that have already been imidized, it is possible to produce anisotropy by directly irradiating light without a high-temperature heat treatment process after the formation of the coating film, followed by conducting a heat treatment to complete the alignment film. Therefore, not only can the light irradiation energy be significantly reduced, but also a liquid crystal alignment film having excellent alignment properties and stability as well as an excellent voltage holding ratio and electrical characteristics can be prepared even by a simple process step including one heat treatment step.

Specifically, in Chemical Formula 12, T is the following Chemical Formula 10-1 or 10-2, and $D_1$ and $D_2$ may each independently be a phenylene group.

[Chemical Formula 10-1]

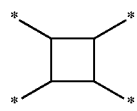

[Chemical Formula 10-2]

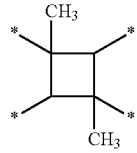

Among the repeating units represented by Chemical Formulae 1, 2, and 3 in the first polymer for a liquid crystal aligning agent, the repeating unit represented by Chemical Formula 1 may be contained in an amount of 5 mol % to 74 mol %, or 10 mol % to 60 mol %, based on the total repeating units.

As described above, when a polymer containing a specific amount of the imide repeating unit represented by Chemical Formula 1 is used, since the first polymer for a liquid crystal aligning agent contains a certain amount of the imide repeating unit that has already been imidized, it is possible to produce a liquid crystal alignment film having alignment properties and stability even when light is irradiated immediately without a heat treatment step.

If the repeating unit represented by Chemical Formula 1 is included at less than the content range, sufficient alignment properties may not be exhibited and alignment stability may be deteriorated. On the contrary, if the content of the repeating unit represented by Chemical Formula 1 exceeds the above content range, the solubility is lowered, and thus it may be difficult to prepare a stable alignment solution capable of coating, which is problematic. Accordingly, it is preferable to include the repeating unit represented by Chemical Formula 1 within the above-mentioned content range, because it can provide a polymer for a liquid crystal aligning agent having excellent storage stability, electrical characteristics, alignment properties, and alignment stability.

Further, the repeating unit represented by Chemical Formula 2 or the repeating unit represented by Chemical Formula 3 can be contained in an appropriate amount depending on the desired characteristics.

Specifically, the repeating unit represented by Chemical Formula 2 may be contained in an amount of 1 mol % to 60 mol %, preferably 5 mol % to 50 mol %, based on the total repeating units represented by Chemical Formulae 1 to 3. The repeating unit represented by Chemical Formula 2 has a low imide conversion rate during the high-temperature heat treatment process after the light irradiation, and thus if it exceeds the above range, the region interacting with the liquid crystal becomes lower, and the alignment property may be relatively decreased. Accordingly, the repeating unit represented by Chemical Formula 2 exhibits appropriate solubility within the above-mentioned range and thus can provide a polymer for a liquid crystal aligning agent capable of realizing a high imidization rate, while having excellent process properties.

Moreover, the repeating unit represented by Chemical Formula 3 may be contained in an amount of 0 mol % to 95 mol %, preferably 10 mol % to 80 mol %, based on the total repeating units represented by Chemical Formulae 1 to 3. Within such a range, excellent coating properties can be exhibited, thereby providing a polymer for liquid crystal aligning agent capable of realizing a high imidization rate, while having excellent process properties.

Meanwhile, in the liquid crystal aligning agent composition according to one embodiment of the invention, the second polymer for a liquid crystal aligning agent may be the repeating units of Chemical Formulae 4 to 6, where $Y_4$ to $Y_6$ may each independently be a bivalent organic group represented by Chemical Formula 13. The $Y_4$, $Y_5$, and $Y_6$ are defined as a bivalent organic group represented by Chemical Formula 13, and can provide a polymer for a liquid crystal aligning agent having various structures capable of exhibiting the above-mentioned effects.

As the second polymer is synthesized from a diamine containing a specific organic functional group represented by Chemical Formula 13, there is a characteristic that it is possible to have a high voltage holding ratio even in a high temperature environment, and to improve the reduction of contrast ratio or the afterimage phenomenon, thereby improving the electrical characteristics.

In Chemical Formula 13, A is a Group 16 element, R' is hydrogen or an alkyl group having 1 to 10 carbon atoms, a is an integer of 0 to 3, at least one, i.e., one or more, of $Z_1$ to $Z_4$ is nitrogen, and the rest are carbon.

The Group 16 element may be oxygen (O), sulfur (S), selenium (Se), tellurium (Te), or polonium (Po). The R' is a functional group which binds to the A, which can be bonded to the element A by the number represented by a. Preferably, in Chemical Formula 13, A is oxygen, and a is 0.

Meanwhile, in Chemical Formula 13, by satisfying the condition that at least one of $Z_1$ to $Z_4$ is nitrogen and the rest are carbon, due to the nitrogen atom, the Chemical Formula 13 can form an asymmetric structure which does not form symmetry with respect to the center point or the center line. Chemical Formula 13 is a repeating unit derived from a diamine having a specific structure containing a nitrogen atom or the like which is a precursor used for forming a polymer for a liquid crystal aligning agent, which is considered to be due to the use of asymmetric diamines as described hereinafter.

Specifically, the functional group represented by Chemical Formula 13 has a structural characteristic in which two aromatic ring compounds, preferably a heteroaromatic ring compound and an aromatic ring compound, are bonded via an ether group. Consequently, even while satisfying the same or a higher level of alignment and after-image characteristics as a liquid crystal aligning agent, the voltage holding ratio is improved so excellent electrical characteristics can be realized.

Meanwhile, the functional group represented by Chemical Formula 13 is characterized in that only an amine group, an ether group, and hydrogen are bonded to each of the two aromatic ring compounds, preferably the heteroaromatic ring compound and the aromatic ring compound, and substituents other than the above are not introduced. When a substituent such as a fluoroalkyl group is introduced into the heteroaromatic cyclic compound or the aromatic ring compound, the alignment properties of the liquid crystal aligning agent are poor and the voltage holding ratio can be remarkably reduced.

More specifically, in Chemical Formula 13, one of $Z_1$ to $Z_4$ may be nitrogen and the rest may be carbon. In Chemical Formula 13, one of $Z_1$ to $Z_4$ is nitrogen and the rest are carbon, and $Z_2$ and $Z_4$ may be carbon. That is, the aromatic ring containing $Z_1$ to $Z_1$ in Chemical Formula 13 may have a pyridine structure. Accordingly, the liquid crystal display device to which the polymer for a liquid crystal aligning agent of one embodiment is applied can realize a high voltage holding ratio and liquid crystal alignment property.

Further, Chemical Formula 13 may include at least one repeating unit selected from the group consisting of the following Chemical Formulae 13-1, 13-2, and 13-3.

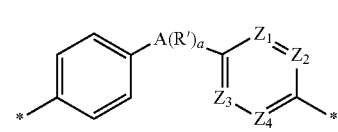

[Chemical Formula 13-1]

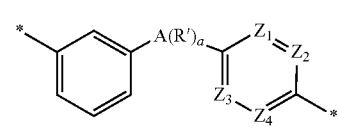

[Chemical Formula 13-2]

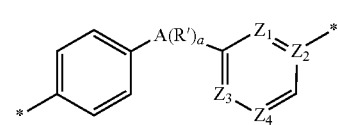

[Chemical Formula 13-3]

In Chemical Formulae 13-1 to 13-3, the definitions of A, $Z_1$ to $Z_4$, R', and a include those described above in Chemical Formula 13.

As described above, as the repeating unit of Chemical Formula 13 contains one or more repeating units selected from the group consisting of Chemical Formula 13-1, Chemical Formula 13-2, and Chemical Formula 13-3, superior liquid crystal alignment properties can be realized.

Meanwhile, in the liquid crystal aligning agent composition according to one embodiment, the content of the second polymer for a liquid crystal aligning agent may be 10 to 1000 parts by weight, or 15 to 800 parts by weight, based on 100 parts by weight of the first polymer for a liquid crystal aligning agent.

When the first polymer for a liquid crystal aligning agent and the second polymer for a liquid crystal aligning agent having such characteristics are mixed and used in the above weight ratio range, excellent photoreaction properties and liquid crystal alignment properties that the first polymer for a liquid crystal aligning agent has can be mutually complemented with excellent electrical characteristics that the second polymer for a liquid crystal aligning agent has. Therefore, it is possible to prepare a liquid crystal alignment film which can not only realize a high imidization rate even while exhibiting excellent coating properties and thus having excellent process properties, but also having excellent electrical characteristics such as with respect to an afterimage or a voltage holding ratio caused by a DC/AC voltage, and further having superior alignment properties and electrical characteristics at the same time.

In addition, in the liquid crystal aligning agent composition according to one embodiment, the content of the third polymer for a liquid crystal aligning agent may be 10 to 1000 parts by weight, or 15 to 800 parts by weight, based on 100 parts by weight of the first polymer for a liquid crystal aligning agent.

Accordingly, when the third polymer for a liquid crystal aligning agent is mixed and used together with the first polymer for a liquid crystal aligning agent and the second polymer for a liquid crystal aligning agent in the above weight ratio range, excellent photoreaction properties and liquid crystal alignment properties that the first polymer for a liquid crystal aligning agent has can be mutually complemented with excellent electrical characteristics that the second polymer for a liquid crystal aligning agent has, and additionally with alignment properties and mechanical properties that the third polymer for a liquid crystal aligning agent has. Therefore, it is possible to prepare a liquid crystal alignment film which can not only realize a high imidization rate even while exhibiting excellent coating properties and thus excellent process properties, but can also have excellent electrical characteristics such as with respect to an afterimage or a voltage holding ratio caused by a DC/AC voltage, and further have enhanced alignment properties and mechanical durability at the same time.

The weight average molecular weight (measured by GPC) of each of the first polymer for a liquid crystal aligning agent, the second polymer for a liquid crystal aligning agent, and the third polymer for a liquid crystal aligning agent is not particularly limited, but may be, for example, from 10,000 g/mol to 200,000 g/mol. The weight average molecular weight means a weight average molecular weight in terms of polystyrene measured by a GPC method.

Method for Preparing Liquid Crystal Alignment Film

In addition, the present invention provides a method for preparing a liquid crystal alignment film including the steps of: coating the liquid crystal aligning agent composition onto a substrate to form a coating film (step 1); drying the coating film (step 2); irradiating the coating film immediately after the drying step with light or rubbing the coating film to perform alignment treatment (step 3); and heat-treating and curing the alignment-treated coating film (step 4).

Step 1 is a step of coating the liquid crystal aligning agent composition onto a substrate to form a coating film.

The method of coating the liquid crystal aligning agent composition onto a substrate is not particularly limited, and for example, a method such as screen printing, offset printing, flexographic printing, inkjet printing, and the like can be used.

Further, the liquid crystal aligning agent composition may be dissolved or dispersed in an organic solvent. Specific examples of the organic solvent include N,N-dimethylformamide, N,N-dimethylacetamide, N-methyl-2-pyrrolidone, N-methylcaprolactam, 2-pyrrolidone, N-ethylpyrrolidone, N-vinylpyrrolidone, dimethyl sulfoxide, tetramethylurea, pyridine, dimethyl sulfone, hexamethyl sulfoxide, γ-butyrolactone, 3-methoxy-N,N-dimethylpropanamide, 3-ethoxy-N,N-dimethylpropanamide, 3-butoxy-N,N-dimethylpropanamide, 1,3-dimethyl-imidazolidinone, ethyl amyl ketone, methyl nonyl ketone, methyl ethyl ketone, methyl isoamyl ketone, methyl isopropyl ketone, cyclohexanone, ethylene carbonate, propylene carbonate, diglyme, 4-hydroxy-4-methyl-2-pentanone, ethylene glycol monomethyl ether, ethylene glycol monomethyl ether acetate, ethylene glycol monoethyl ether, ethylene glycol monoethyl ether acetate, ethylene glycol monopropyl ether, ethylene glycol monopropyl ether acetate, ethylene glycol monoisopropyl ether, ethylene glycol monoisopropyl ether acetate, ethylene glycol monobutyl ether, ethylene glycol monobutyl ether acetate, and the like. They can be used alone or in combination of two or more thereof.

In addition, the liquid crystal aligning agent composition may further include other components in addition to the organic solvent. In a non-limiting example, when the liquid crystal aligning agent composition is coated, additives capable of improving the uniformity of the thickness of a film and the surface smoothness, improving the adhesion between a liquid crystal alignment film and a substrate, changing the dielectric constant and conductivity of a liquid crystal alignment film, or increasing the density of a liquid crystal alignment film, may be further included. Examples of these additives include various kinds of solvents, surfactants, silane-based compounds, dielectrics, crosslinking compounds, etc.

Step 2 is a step of drying the coating film formed by coating the liquid crystal aligning agent composition onto a substrate.

The step of drying the coating film may be performed by using a method such as heating of a coating film or vacuum evaporation, and is preferably performed at 50° C. to 150° C., or 60° C. to 140° C.

Step 3 is a step of irradiating the coating film immediately after the drying step with light or rubbing the coating film to perform alignment treatment.

As used herein, the "coating film immediately after the drying step" refers to irradiating the film with light immediately after the drying without carrying out heat treatment at a temperature of higher than that of the drying step, and steps other than the heat treatment can be added.

More specifically, when a liquid crystal alignment film is prepared by using a conventional liquid crystal aligning agent including a polyamic acid or a polyamic acid ester, it includes a step of irradiating light after essentially performing a high-temperature heat treatment for imidization of the polyamic acid. However, when a liquid crystal alignment film is prepared using the liquid crystal aligning agent of the one embodiment described above, it does not include the heat treatment step, and light is directly irradiated to perform alignment treatment, and then the alignment-treated coating film is cured by heat treatment, thereby being capable of preparing a liquid crystal alignment film.

Further, in the alignment treatment step, the light irradiation may be performed by irradiating polarized ultraviolet rays having a wavelength of 150 nm to 450 nm. In this case, the intensity of the light exposure may vary depending on the kind of the polymer for a liquid crystal aligning agent, and preferably energy of 10 mJ/cm$^2$ to 10 J/cm$^2$, or 30 mJ/cm$^2$ to 2 J/cm$^2$, may be irradiated.

As for the ultraviolet rays, the polarized ultraviolet rays selected among the ultraviolet rays subjected to polarization treatment by a method of passing through or reflecting with a polarizing device using a substrate in which a dielectric anisotropic material is coated onto the surface of a transparent substrate such as quartz glass, soda lime glass, soda lime-free glass, etc., a polarizer plate on which aluminum or metal wires are finely deposited, or a Brewster's polarizing device by the reflection of quartz glass, etc., are irradiated to perform the alignment treatment. Herein, the polarized ultraviolet rays may be irradiated perpendicularly to the surface of the substrate, or may be irradiated by directing an angle of incidence toward a specific angle. By this method, the alignment ability of the liquid crystal molecules is imparted to the coating film.

Further, in the alignment treatment step, a rubbing treatment may employ a method using a rubbing cloth. More specifically, in the rubbing treatment, the surface of the coating film after the heat treatment step can be rubbed in one direction while rotating a rubbing roller in which a rubbing cloth is attached to a metal roller.

Step 4 is a step of heat-treating and curing the alignment-treated coating film.

The step of heat-treating and curing the alignment-treated coating film is a step that is performed after light irradiation even in the conventional method of preparing a liquid crystal alignment film using a polymer for a liquid crystal aligning agent containing a polyamic acid or a polyamic acid ester, and is distinguished from a heat treatment step that is performed by coating the liquid crystal aligning agent composition onto a substrate and then performing imidization of the liquid crystal aligning agent before irradiating the light or while irradiating the light.

In this case, the heat treatment may be performed by a heating means such as a hot plate, a hot-air circulation furnace, an infrared furnace, and the like, and the heat treatment is preferably performed at a temperature of 150° C. to 300° C., or 180° C. to 250° C.

Meanwhile, the method may further include heat-treating the coating film immediately after the drying step at a temperature of equal to or higher than that of the drying step, if necessary, after a step of drying the coating film (step 2). The heat treatment may be performed by a heating means such as a hot plate, a hot-air circulation furnace, or an infrared furnace, and is preferably carried out at 150° C. to 250° C. In this process, the liquid crystal aligning agent can be imidized.

That is, the method for preparing a liquid crystal alignment film may include the steps of: coating the above-mentioned liquid crystal aligning agent onto a substrate to form a coating film (step 1); drying the coating film (step 2); heat-treating the coating film immediately after the drying step at a temperature of equal to or higher than that of the drying step (step 3); irradiating the heat-treated coating film with light or rubbing the coating film to perform alignment treatment (step 4); and heat-treating and curing the alignment-treated coating film (step 5).

Liquid Crystal Alignment Film

Further, the present invention may provide a liquid crystal alignment film prepared in accordance with the method for preparing a liquid crystal alignment film described above.

Specifically, the liquid crystal alignment film may include an aligned cured product of the liquid crystal aligning agent composition of the one embodiment. The aligned cured product means a material obtained through an alignment step and a curing step of the liquid crystal aligning agent composition of the one embodiment.

As described above, when a liquid crystal aligning agent composition containing a first polymer for a liquid crystal aligning agent, a second polymer for a liquid crystal aligning agent, and a third polymer for a liquid crystal aligning agent is used, a liquid crystal alignment film having enhanced stability and excellent electrical characteristics can be prepared.

The thickness of the liquid crystal alignment film is not particularly limited, but for example, it can be freely adjusted within the range of 0.01 μm to 1000 μm. If the thickness of the liquid crystal alignment film increases or decreases by a specific value, the physical properties measured in the alignment film may also change by a certain value.

Liquid Crystal Display Device

In addition, the present invention provides a liquid crystal display device including the liquid crystal alignment film described above.

The liquid crystal alignment film may be introduced into a liquid crystal cell by a known method, and likewise, the liquid crystal cell may be introduced into a liquid crystal display device by a known method. The liquid crystal alignment film can be prepared from the liquid crystal aligning agent composition of another embodiment, thereby achieving excellent stability together with excellent various physical properties. Specifically, the liquid crystal display device capable of having a high voltage holding ratio at a high temperature and a low frequency, and having excellent electrical properties, reducing the performance degradation of contrast ratio or the image sticking (after-image) phenomenon, and further having excellent film strength, can be provided.

Advantageous Effects

According to the present invention, a liquid crystal aligning agent composition for preparing a liquid crystal alignment film having enhanced stability and exhibiting excellent electrical characteristics, a method for preparing a liquid crystal alignment film using the same, and a liquid crystal alignment film and a liquid crystal display device using the same can be provided.

DETAILED DESCRIPTION OF THE EMBODIMENTS

The prevention invention will be described in more detail by way of examples.

However, these examples are given for illustrative purposes only, and the scope of the invention is not intended to be limited by these examples.

PREPARATION EXAMPLE

Preparation Example 1: Preparation of Diamine DA1-1

Diamine DA1-1 was synthesized according to the following reaction scheme.

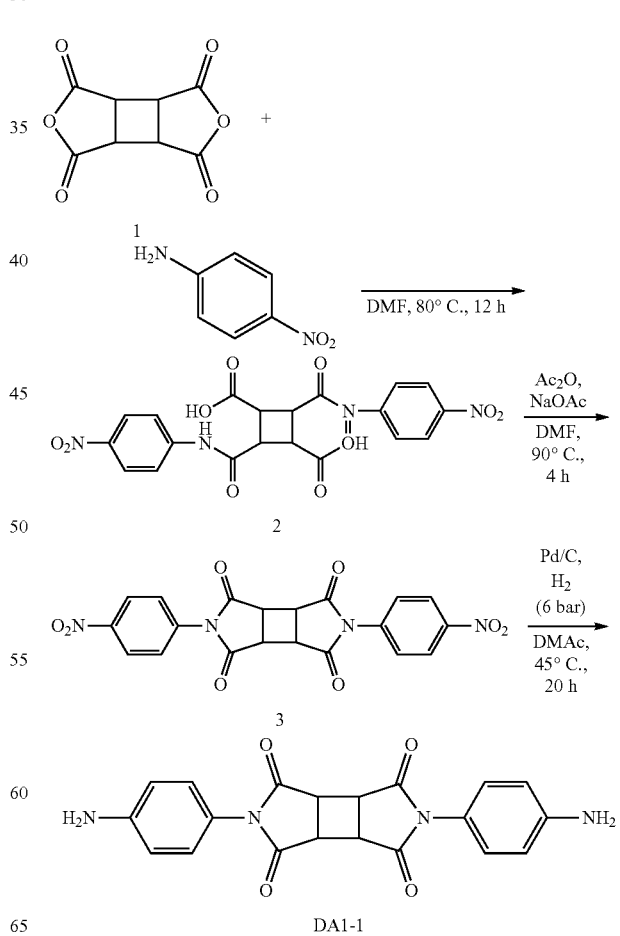

Specifically, CBDA (cyclobutane-1,2,3,4-tetracarboxylic dianhydride, Compound 1) and 4-nitroaniline were dissolved in DMF (dimethylformamide) to prepare a mixture. Then, the mixture was reacted at about 80° C. for about 12 hours to prepare an amic acid of Compound 2. Subsequently, the amic acid was dissolved in DMF, and acetic anhydride and sodium acetate were added thereto to prepare a mixture. Then, the amic acid contained in the mixture was imidized at about 90° C. for about 4 hours to obtain Compound 3. The imide of Compound 3 thus obtained was dissolved in DMAc (dimethylacetamide), and then Pd/C was added thereto to prepare a mixture. The resulting mixture was reduced at about 45° C. under hydrogen pressure of about 6 bar for about 20 hours to prepare diamine DA1-1.

Preparation Example 2: Preparation of Diamine DA1-2

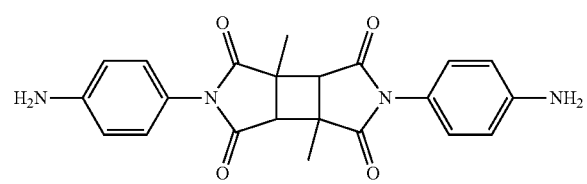

DA1-2 having the above structure was prepared in the same manner as in Preparation Example 1, except that DMCBDA (1,3-dimethylcyclobutane-1,2,3,4-tetracarboxylic acid dianhydride) was used instead of CBDA (cyclobuthane-1,2,3,4-tetracarboxylic dianhydride).

Preparation Example 3: Preparation of Diamine DA2

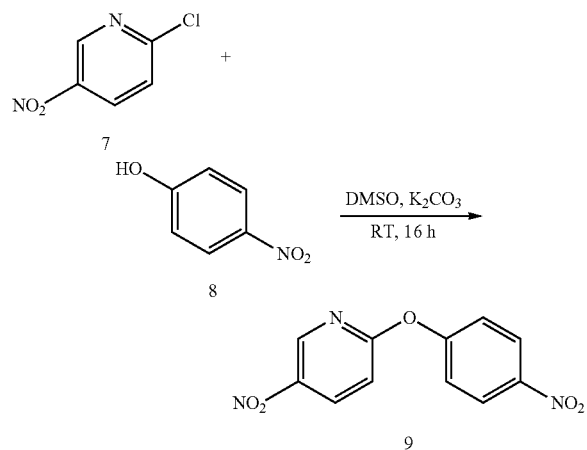

17.1 g (100 mmol) of 2-chloro-5-nitropyridine (Compound 7) and 12.5 g (98.6 mmol) of 4-nitrophenol (Compound 8) were completely dissolved in 200 mL of dimethyl sulfoxide (DMSO).

27.2 g (200 mmol) of potassium carbonate ($K_2CO_3$) was then added thereto and stirred at room temperature for about 16 hours. When the reaction was completed, the reaction product was added to a container containing about 500 mL of water and stirred for about 1 hour. A solid obtained by filtration was washed with about 200 mL of water and about 200 mL of ethanol to synthesize 16 g (61.3 mmol) of Compound 9 (yield: 57%).

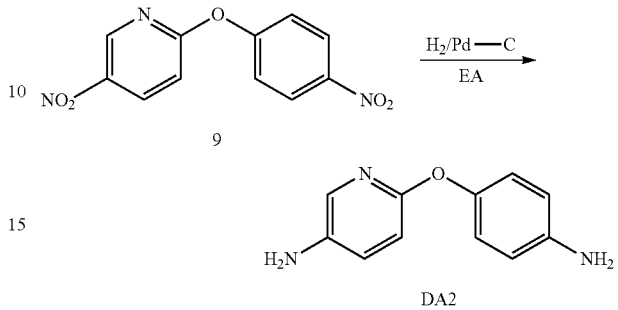

Compound 9 was dissolved in about 200 mL of a 1:1 mixed solution of ethyl acetate (EA) and THF 0.8 g of palladium (Pd)/carbon (C) was then added thereto and stirred under a hydrogen atmosphere for 12 hours. After completion of the reaction, the reaction mixture was filtered through a celite pad and the filtrate was concentrated to prepare 11 g of diamine compound DA2 (pODA) (yield: 89%).

SYNTHESIS EXAMPLE

A first polymer, a second polymer, and a third polymer were synthesized using the reactants shown in Table 1 below. Concrete synthesis conditions of respective Synthesis Examples 1 to 8 are shown in Table 1 below.

TABLE 1

| | Synthesis Example | Diamine | Acid anhydride |
|---|---|---|---|
| First polymer | | | |
| | Synthesis Example 1 (P-1) | Preparation Example 1 (DA1-1) | DMCBDA |
| | Synthesis Example 2 (P-2) | Preparation Example 2 (DA1-2) | DMCBDA |
| | Comparative Synthesis Example 1 (S-1) | p-PDA | DMCBDA |
| Second polymer | Synthesis Example | Diamine | Acid anhydride |
| | Synthesis Example 3 (Q-1) | Preparation Example 3 (DA2) | BT-100 |
| | Synthesis Example 4 (Q-2) | Preparation Example 3 (DA2) | CHDA |
| | Synthesis Example 5 (Q-3) | Preparation Example 3 (DA2) | PMDA |
| | Comparative Synthesis Example 2 (S-2) | Chemical Formula A | BT-100 |
| Third polymer | Synthesis Example | Diamine | Acid anhydride |
| | Synthesis Example 6 (R-1) | ODA | BPDA |
| | Synthesis Example 7 (R-2) | EODA | BPDA |
| | Synthesis Example 8 (R-3) | MDA | BPDA |

Synthesis Examples 1 and 2: Synthesis of First Polymer

Synthesis Example 1: Preparation of Polymer P-1 for Liquid Crystal Aligning Agent 5.0 g (13.3 mmol) of DA1-1 prepared in Preparation Example 1 was completely dissolved in 71.27 g of anhydrous N-methyl pyrrolidone (NMP). 2.92 g (13.03 mmol) of 1,3-dimethyl-cyclobuthane-1,2,3,4-tetracarboxylic dianhydride (DMCBDA) was then added to the solution under an ice bath and stirred at room temperature for about 16 hours to prepare a polymer P-1 for a liquid crystal aligning agent.

As a result of confirming the molecular weight of the polymer P-1 through GPC, the number average molecular weight (Mn) was 15,500 g/mol, and the weight average molecular weight (Mw) was 31,000 g/mol. Further, the monomer structure of the polymer P-1 is determined by the equivalent ratio of the monomers used, and the ratio of the imide structure in the molecule was 50.5%, while the ratio of the amic acid structure was 49.5%.

Synthesis Example 2: Preparation of Polymer P-2 for Liquid Crystal Aligning Agent 5.376 g of DA1-2 prepared in Preparation Example 2 was first dissolved in 74.66 g of NMP. 2.92 g of 1,3-dimethyl-cyclobuthane-1,2,3,4-tetracarboxylic dianhydride (DMCBDA) was then added thereto and stirred at room temperature for about 16 hours. Then, the polymer P-2 was prepared in the same manner as in Synthesis Example 1.

As a result of confirming the molecular weight of the polymer P-2 through GPC, the number average molecular weight (Mn) was 17,300 g/mol, while the weight average molecular weight (Mw) was 34,000 g/mol. Further, as for the polymer P-2, the ratio of the imide structure in the molecule was 50.5%, and the ratio of the amic acid structure was 49.5%.

Comparative Synthesis Example 1: Synthesis of First Polymer

Comparative Synthesis Example 1: Preparation of Polymer S-1 for Liquid Crystal Aligning Agent A polymer S-1 for a liquid crystal aligning agent was prepared in the same manner as in Synthesis Example 1, except that para-phenylenediamine (p-PDA) was used instead of DA1-1 prepared in Preparation Example 1.

Synthesis Examples 3 to 5: Synthesis of Second Polymer

Synthesis Example 3: Preparation of Polymer Q-1 for Liquid Crystal Aligning Agent 18.082 g (0.090 mmol) of the diamine DA2 prepared in Preparation Example 3 was completely dissolved in 225.213 g of anhydrous N-methyl pyrrolidone (NMP).

18.228 g (0.084 mmol) of tetrahydro-[3,3'-bifuran]-2,2',5,5'-tetraone (BT100) was then added to the solution under an ice bath and stirred at room temperature for about 16 hours to prepare a polymer Q-1 for a liquid crystal alignment agent. As a result of confirming the molecular weight of the polymer Q-1 through GPC, the weight average molecular weight (Mw) was 21,000 g/mol.

Synthesis Example 4: Preparation of Polymer Q-2 for Liquid Crystal Aligning Agent 19.907 g (0.099 mmol) of the diamine DA2 prepared in Preparation Example 3 was completely dissolved in 29.676 g of anhydrous N-methyl pyrrolidone (NMP).

20.624 g (0.092 mmol) of 1,2,4,5-cyclohexanetetracarboxylic dianhydride (CHDA) was then added to the solution under an ice bath and stirred at room temperature for about 16 hours to prepare a polymer Q-2 for a liquid crystal alignment agent. As a result of confirming the molecular weight of the polymer Q-2 through GPC, the weight average molecular weight (Mw) was 19,780 g/mol.

Synthesis Example 5: Preparation of Polymer Q-3 for Liquid Crystal Aligning Agent 19.840 g (0.099 mmol) of the diamine DA2 prepared in Preparation Example 3 was completely dissolved in 225.213 g of anhydrous N-methyl pyrrolidone (NMP).

20.0 g (0.092 mmol) of pyromellitic dianhydride (PMDA) was then added to the solution under an ice bath and stirred at room temperature for about 16 hours to prepare a polymer Q-3 for a liquid crystal alignment agent. As a result of confirming the molecular weight of the polymer Q-3 through GPC, the weight average molecular weight (Mw) was 27,000 g/mol.

Synthesis Examples 6 to 8: Synthesis of Third Polymer

Synthesis Example 6: Preparation of Polymer R-1 for Liquid Crystal Aligning Agent 19.743 g (0.099 mmol) of 4,4'-oxydianiline (ODA) was completely dissolved in 225.208 g of anhydrous N-methyl pyrrolidone (NMP).

27.068 g (0.092 mmol) of 3,3',4,4'-biphenyl tetracarboxylic acid dianhydride (BPDA) was then added to the solution under an ice bath and stirred at room temperature for about 16 hours to prepare a polymer R-1 for a liquid crystal alignment agent. As a result of confirming the molecular weight of the polymer R-1 through GPC, the weight average molecular weight (Mw) was 26,800 g/mol.

Synthesis Example 7: Preparation of Polymer R-2 for Liquid Crystal Aligning Agent 17.856 g (0.073 mmol) of 4,4'-(ethane-1,2-diylbis(oxy))dianiline (EODA) was completely dissolved in 214.516 g of anhydrous N-methyl pyrrolidone (NMP).

27.068 g (0.068 mmol) of 3,3',4,4'-biphenyl tetracarboxylic acid dianhydride (BPDA) was then added to the solution under an ice bath and stirred at room temperature for about 16 hours to prepare a polymer R-2 for a liquid crystal alignment agent. As a result of confirming the molecular weight of the polymer R-2 through GPC, the weight average molecular weight (Mw) was 26,700 g/mol.

Synthesis Example 8: Preparation of Polymer R-3 for Liquid Crystal Aligning Agent 19.548 g (0.089 mmol) of 4,4'-methylenedianiline (MDA) was completely dissolved in 224.218 g of anhydrous N-methyl pyrrolidone (NMP).

27.068 g (0.092 mmol) of 3,3',4,4'-biphenyl tetracarboxylic acid dianhydride (BPDA) was then added to the solution under an ice bath and stirred at room temperature for about 16 hours to prepare a polymer R-3 for a liquid crystal alignment agent. As a result of confirming the molecular weight of the polymer R-3 through GPC, the weight average molecular weight (Mw) was 22650 g/mol.

Comparative Synthesis Example: Preparation of Second Polymer

Comparative Synthesis Example 2: Preparation of Polymer S-2 for Liquid Crystal Aligning Agent A polymer S-2 for a liquid crystal aligning agent was prepared in the same manner as in Synthesis Example 3, except that a compound represented by the following Chemical Formula A was used instead of the diamine DA2 prepared in Preparation Example 3.

[Chemical Formula A]

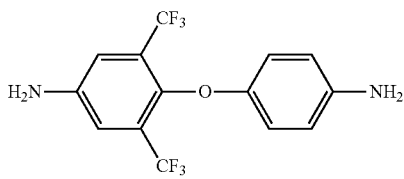

Examples and Comparative Examples: Preparation of Liquid Crystal Aligning Agent Composition A first polymer, a second polymer, and a third polymer were dissolved in a mixed solvent of NMP, GBL, and 2-butoxyethanol in a composition as shown in Table 2 below, and the obtained solution was subjected to pressure filtration through a filter having a pore size of 0.1 tan made of poly(tetrafluoroethylene) to prepare a liquid crystal aligning agent composition.

Experimental Example

A liquid crystal cell was prepared by using the liquid crystal aligning agent compositions prepared in the examples and comparative examples.

Specifically, the liquid crystal aligning agent composition was coated onto each of upper and lower substrates for the voltage holding ratio (VHR) in which an electrode having a thickness of 60 nm and an area of 1 cm×1 cm was patterned on a rectangular glass substrate having a size of 2.5 cm×2.7 cm using a spin coating method. Then, the substrates onto which the liquid crystal aligning agent composition was coated were placed on a hot plate at about 70° C. and dried for 3 minutes to evaporate the solvent. In order to subject the thus-obtained coating film to alignment treatment, ultraviolet rays of 254 nm were irradiated with intensity of 0.1 to 1 J/cm² using an exposure apparatus in which a linear polarizer was adhered to the coating film of each of the upper/lower plates. Subsequently, the alignment-treated upper/lower plates were calcinated (cured) in an oven at about 230° C. for 30 minutes to obtain a coating film having a thickness of 0.1 μm. Then, a sealing agent impregnated with ball spacers having a size of 4.5 μm was coated onto the edge of the upper plate excluding the liquid crystal injection hole. Then, the alignment films formed on the upper plate and the lower plate were aligned such that they faced each other and the alignment directions are aligned with each other, and then the upper and lower plates were bonded together and the sealing agent was UV- and heat-cured to prepare an empty cell. Subsequently, a liquid crystal was injected into the empty cell, and the injection port was sealed with a sealing agent to prepare a liquid crystal alignment cell.

1) Evaluation of Liquid Crystal Alignment Properties

Polarizing plates were adhered to the upper and lower plates of the liquid crystal cell prepared as above so that their polarization axes are perpendicular to each other. The liquid crystal cell to which the polarizing plates were adhered was then placed on a backlight of brightness of 7000 cd/m², and light leakage was observed with the naked eye. At this time, if the alignment properties of the liquid crystal alignment film are excellent and the liquid crystal is arranged well, light does not pass through the upper and lower polarizing plates, and it is observed to be dark without defects. In this case, the alignment properties are evaluated as 'good', and when light leakage such as a liquid crystal flow mark or a bright spot is observed, it is evaluated as 'poor'. The results are shown in Table 2 below.

2) Measurement of Voltage Holding Ratio (VHR)

The voltage holding ratio (VHR), which is an electrical characteristic of the prepared liquid crystal alignment cell, was measured using 6254C equipment available from TOYO Corporation. The voltage holding ratio (VHR) was measured under the conditions of 1 Hz and 60° C. (VHR 60° C. and 1 Hz n-LC conditions). The measurement results of the voltage holding ratio (VHR) of the liquid crystal alignment cell are shown in Table 2 below.

3) Evaluation of Alignment Stability (AC Afterimage)

Polarizing plates were adhered to the upper plate and lower plate of the liquid crystal cell so that their polarization axes are perpendicular to each other. The liquid crystal cell to which the polarizing plates were adhered was adhered onto a backlight of 7000 cd/m², and the brightness in a black mode was measured using PR-880 equipment which is a device for measuring brightness. Then, the liquid crystal cell was driven at room temperature for 24 hours with an AC voltage of 5 V. Thereafter, the brightness in a black mode was measured in the same manner as described above in a state in which the voltage of the liquid crystal cell was turned off. The difference between the initial brightness (L0) measured before driving the liquid crystal cell and the final brightness (L1) measured after driving the liquid cell was divided by the value of the initial brightness (L0) and multiplied by 100, thereby calculating the brightness variation. As the calculated brightness variation is closer to 0%, it means that the alignment stability is excellent. The level of afterimage was evaluated through the measurement result of such brightness variation according the following criteria. AC afterimage is preferably minimized. In the measurement results, if the brightness variation is less than 10%, it is evaluated as "excellent"; if the brightness variation is 10% to 20%, it is evaluated as "ordinary"; and if the brightness variation is greater than 20%, it is evaluated as "poor". The results are shown in Table 2 below.

TABLE 2

| Category | First polymer | Second polymer | Third polymer | Weight ratio of polymer (1st polymer: 3rd polymer: 2nd polymer) | Liquid crystal alignment property | Alignment stability | VHR(%) |
|---|---|---|---|---|---|---|---|
| Example 1 | P-1 | Q-1 | R-1 | 5:4:1 | Good | Excellent | 77 |
| Example 2 | P-1 | Q-2 | R-1 | 5:4:1 | Good | Excellent | 78 |
| Example 3 | P-1 | Q-3 | R-1 | 5:4:1 | Good | Excellent | 75 |
| Example 4 | P-1 | Q-1 | R-2 | 5:4:1 | Good | Excellent | 80 |
| Example 5 | P-1 | Q-2 | R-2 | 5:4:1 | Good | Excellent | 82 |
| Example 6 | P-1 | Q-3 | R-2 | 5:4:1 | Good | Excellent | 77 |
| Example 7 | P-1 | Q-1 | R-3 | 5:4:1 | Good | Excellent | 79 |
| Example 8 | P-1 | Q-2 | R-3 | 5:4:1 | Good | Excellent | 77 |
| Example 9 | P-1 | Q-3 | R-3 | 5:4:1 | Good | Excellent | 78 |
| Example 10 | P-2 | Q-1 | R-1 | 5:4:1 | Good | Excellent | 83 |
| Example 11 | P-2 | Q-2 | R-1 | 5:4:1 | Good | Excellent | 82 |
| Example 12 | P-2 | Q-3 | R-1 | 5:4:1 | Good | Excellent | 81 |
| Example 13 | P-2 | Q-1 | R-2 | 5:4:1 | Good | Excellent | 79 |
| Example 14 | P-2 | Q-2 | R-2 | 5:4:1 | Good | Excellent | 80 |
| Example 15 | P-2 | Q-3 | R-2 | 5:4:1 | Good | Excellent | 81 |
| Example 16 | P-2 | Q-1 | R-3 | 5:4:1 | Good | Excellent | 79 |
| Example 17 | P-2 | Q-2 | R-3 | 5:4:1 | Good | Excellent | 79 |
| Example 18 | P-2 | Q-3 | R-3 | 5:4:1 | Good | Excellent | 80 |
| Example 19 | P-2 | Q-1 | R-1 | 2:7:1 | Good | Excellent | 81 |
| Example 20 | P-2 | Q-1 | R-1 | 3:5:2 | Good | Excellent | 79 |
| Example 21 | P-2 | Q-1 | R-1 | 5:2:3 | Good | Excellent | 77 |
| Comparative Example 1 | P-1 | — | R-1 | 5:5 | Good | Ordinary | 63 |
| Comparative Example 2 | P-2 | — | R-1 | 5:5 | Good | Excellent | 65 |
| Comparative Example 3 | P-1 | Q-1 | — | 5:5 | Poor | Poor | 78 |
| Comparative Example 4 | S-1 | Q-1 | R-1 | 5:4:1 | Poor | Poor | 48 |
| Comparative Example 5 | P-1 | S-2 | R-1 | 5:4:1 | Poor | Poor | 47 |

As shown in Table 2, it can be confirmed that in the case of Examples 1 to 21 in which all three polymers of the first polymer, the second polymer, and the third polymer are mixed, it is possible to realize a high voltage holding ratio of 75% or more together with excellent liquid crystal alignment property and alignment stability at the same time.

Meanwhile, when comparing Comparative Example 4 with Example 1, it is confirmed that when the first polymer synthesized by using a specific diamine synthesized in Preparation Example 1 as in Example 1 is used, it is possible to achieve superior liquid crystal alignment properties and electrical characteristics.

In addition, when comparing Comparative Examples 5 with Example 1, it is confirmed that when the second polymer synthesized by using the specific diamine synthesized in Preparation Example 3 as in Example 1 is used, it is possible to achieve superior liquid crystal alignment properties and electrical characteristics.

The invention claimed is:
1. A liquid crystal aligning agent composition comprising:
a first polymer for a liquid crystal aligning agent including one or more repeating units selected from the group consisting of a repeating unit represented by Chemical Formula 1, a repeating unit represented by Chemical Formula 2, and a repeating unit represented by Chemical Formula 3;
a second polymer for a liquid crystal aligning agent including one or more repeating units selected from the group consisting of a repeating unit represented by Chemical Formula 4, a repeating unit represented by Chemical Formula 5, and a repeating unit represented by Chemical Formula 6; and
a third polymer for a liquid crystal aligning agent including one or more repeating units selected from the group consisting of a repeating unit represented by Chemical Formula 7, a repeating unit represented by Chemical Formula 8, and a repeating unit represented by Chemical Formula 9:

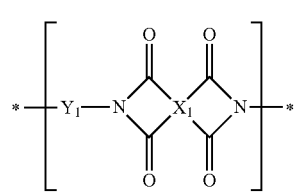

[Chemical Formula 1]

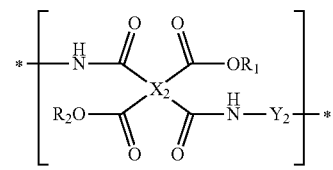

[Chemical Formula 2]

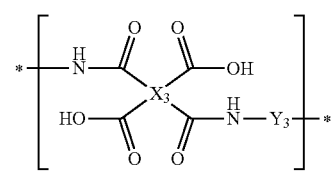

[Chemical Formula 3]

[Chemical Formula 4]

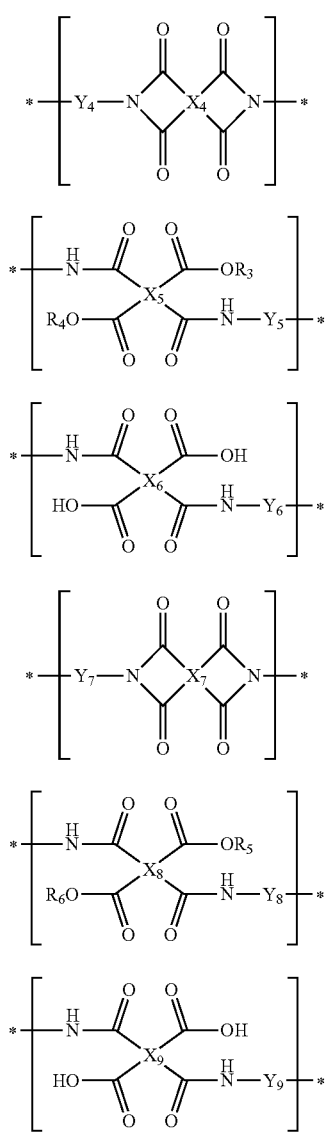

[Chemical Formula 5]

[Chemical Formula 6]

[Chemical Formula 7]

[Chemical Formula 8]

[Chemical Formula 9]

wherein, in the Chemical Formulae 1 to 9,
at least one of $R_1$ and $R_2$ is an alkyl group having 1 to 10 carbon atoms and the other is hydrogen,
at least one of $R_3$ and $R_4$ is an alkyl group having 1 to 10 carbon atoms and the other is hydrogen,
at least one of $R_5$ and $R_6$ is an alkyl group having 1 to 10 carbon atoms and the other is hydrogen, and
$X_1$ to $X_9$ are each independently a tetravalent organic group represented by Chemical Formula 10,

[Chemical Formula 10]

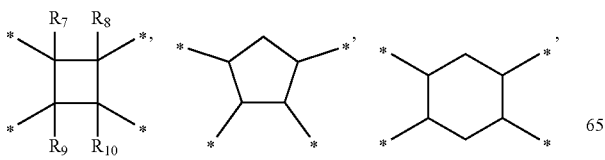

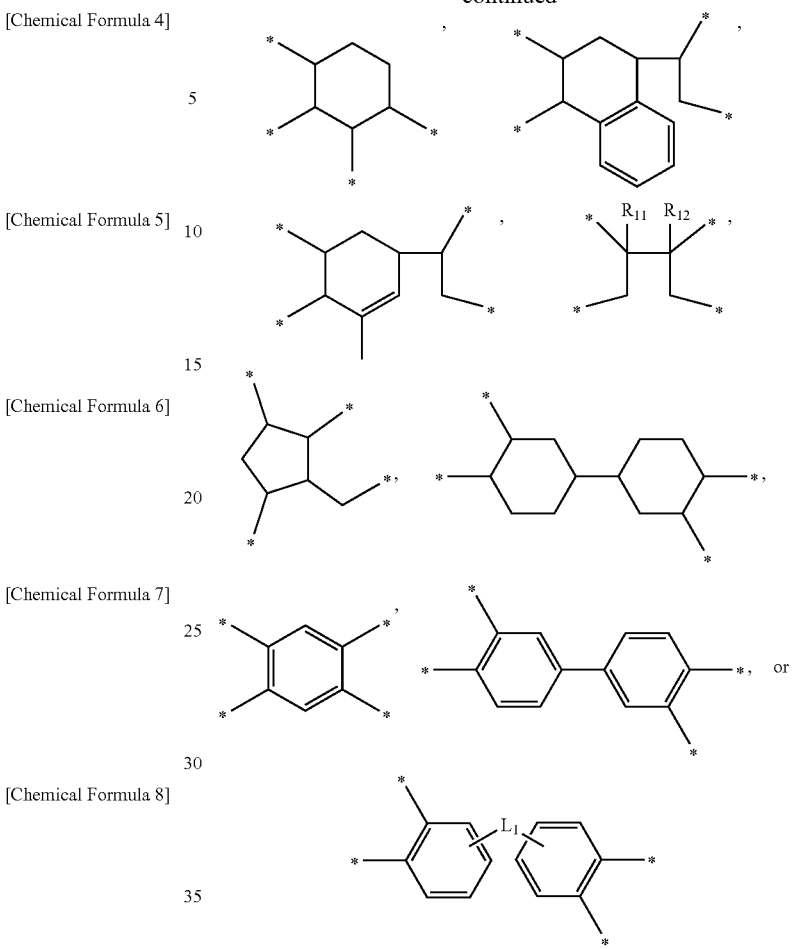

wherein, in the Chemical Formula 10,
$R_7$ to $R_{12}$ are each independently hydrogen or an alkyl group having 1 to 6 carbon atoms,
$L_1$ is any one selected from the group consisting of a single bond, —O—, —CO—, —COO—, —S—, —SO—, —SO$_2$—, —CR$_{13}$R$_{14}$—, —(CH$_2$)$_Z$—, —O(CH$_2$)$_Z$O—, COO(CH$_2$)$_Z$OCO—, —CONH—, phenylene, and a combination thereof,
wherein $R_{13}$ and $R_{14}$ are each independently hydrogen, or an alkyl group or a fluoroalkyl group having 1 to 10 carbon atoms,
z is an integer of 1 to 10, and
$Y_7$ to $Y_9$ are each independently a divalent organic group represented by Chemical Formula 11,

[Chemical Formula 11]

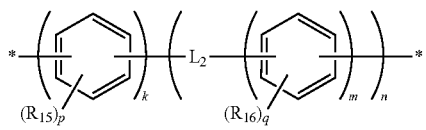

wherein, in the Chemical Formula 11,
$R_{15}$ and $R_{16}$ are each independently hydrogen, a halogen, a cyano, a nitrile, an alkyl having 1 to 10 carbon atoms, an alkenyl having 1 to 10 carbon atoms, an alkoxy having 1 to 10 carbon atoms, a fluoroalkyl having 1 to 10 carbon atoms, or a fluoroalkoxy having 1 to 10 carbon atoms, p and q are each independently an integer of 0 to 4, $L_2$ is a single bond, —O—, —CO—, —S—, —$SO_2$—, —C($CH_3$)$_2$—, —C($CF_3$)$_2$—, —CONH—, —COO—, —($CH_2$)$_y$—, —O($CH_2$)$_y$O—, —O($CH_2$)$_y$—, —NH—, —NH($CH_2$)$_y$—NH—, —NH($CH_2$)$_y$O—, —O$CH_2$—C($CH_3$)$_2$—$CH_2$O—, —COO—($CH_2$)$_y$—OCO—, or —OCO—($CH_2$)$_y$—COO—, y is an integer of 1 to 10, k and m are each independently an integer of 0 to 3, n is an integer of 0 to 3, and $Y_1$ to $Y_3$ are each independently a divalent organic group represented by Chemical Formula 12,

[Chemical Formula 12]

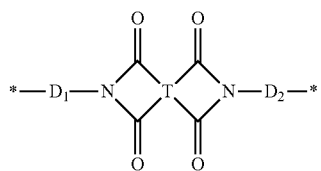

wherein, in the Chemical Formula 12,

T is a tetravalent organic group represented by the Chemical Formula 10, $D_1$ and $D_2$ are each independently an alkylene group having 1 to 20 carbon atoms, a heteroalkylene group having 1 to 10 carbon atoms, a cycloalkylene group having 3 to 20 carbon atoms, an arylene group having 6 to 20 carbon atoms, or a heteroarylene group having 2 to 20 carbon atoms, and $Y_4$ to $Y_6$ are each independently a divalent organic group represented by Chemical Formula 13,

[Chemical Formula 13]

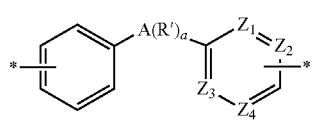

wherein, in Chemical Formula 13,

A is a Group 16 element selected from the group of oxygen, sulfur, selenium, tellurium, and polonium, R' is hydrogen or an alkyl having 1 to 10 carbon atoms, a is an integer of 0 to 3, and at least one of $Z_1$ to $Z_4$ is nitrogen, and the rest are carbon.

2. The liquid crystal aligning agent composition of claim 1, wherein in the Chemical Formula 13, one of $Z_1$ to $Z_4$ is nitrogen, and the rest are carbon.

3. The liquid crystal aligning agent composition of claim 1, wherein in the Chemical Formula 13, one of $Z_1$ to $Z_4$ is nitrogen, the rest are carbon, and $Z_2$ and $Z_4$ are carbon.

4. The liquid crystal aligning agent composition of claim 1, wherein in the Chemical Formula 13, A is oxygen, and a is 0.

5. The liquid crystal aligning agent composition of claim 1, wherein the Chemical Formula 13 includes at least one repeating unit selected from the group consisting of Chemical Formulae 13-1, 13-2, and 13-3:

[Chemical Formula 13-1]

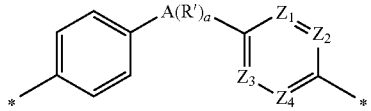

[Chemical Formula 13-2]

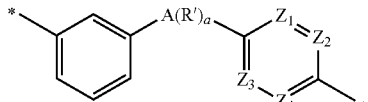

[Chemical Formula 13-3]

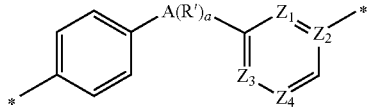

wherein, in the Chemical Formulae 13-1 to 13-3,

A, $Z_1$ to $Z_4$, R', and a are as defined in claim 1.

6. The liquid crystal aligning agent composition of claim 1, wherein, in the Chemical Formula 12, T is Chemical Formula 10-1 or 10-2, and $D_1$ and $D_2$ are each independently a phenylene group:

[Chemical Formula 10-1]

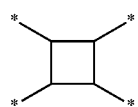

[Chemical Formula 10-2]

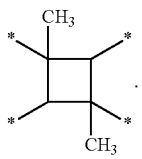

7. The liquid crystal aligning agent composition of claim 1, wherein the second polymer is contained in an amount of 10 to 1000 parts by weight, based on 100 parts by weight of the first polymer.

8. The liquid crystal aligning agent composition of claim 1, wherein the third polymer for a liquid crystal aligning agent is an amount of 10 to 1000 parts by weight, based on 100 parts by weight of the first polymer.

9. A method for preparing a liquid crystal alignment film comprising the steps of:
coating the liquid crystal aligning agent composition of claim 1 onto a substrate to form a coating film;
drying the coating film;
alignment treatment by irradiating the coating film immediately after the drying step with light or rubbing the coating film; and
heat-treating and curing the alignment-treated coating film.

10. The method for preparing a liquid crystal alignment film of claim 9, wherein the liquid crystal aligning agent composition is dissolved or dispersed in an organic solvent.

11. The method for preparing a liquid crystal alignment film of claim 9, wherein the step of drying the coating film is performed at 50° C. to 150° C.

12. The method for preparing a liquid crystal alignment film of claim 9, wherein the light in the alignment treatment step, is polarized ultraviolet rays having a wavelength of 150 nm to 450 nm.

13. The method for preparing a liquid crystal alignment film of claim 9, wherein in the step of curing the coating film, the temperature of the heat treatment is 150° C. to 300° C.

14. A liquid crystal alignment film comprising an aligned cured product of the liquid crystal aligning agent composition of claim 1.

15. A liquid crystal display device comprising the liquid crystal alignment film of claim 14.

16. A liquid crystal alignment film produced by the method of claim 9.

17. A liquid crystal display device comprising the liquid crystal alignment film of claim 16.

* * * * *